US012516569B2

(12) United States Patent
Davidson

(10) Patent No.: US 12,516,569 B2
(45) Date of Patent: *Jan. 6, 2026

(54) MODULAR LADDER WITH CENTRAL MAST

(71) Applicant: Curt Davidson, San Marcos, CA (US)

(72) Inventor: Curt Davidson, San Marcos, CA (US)

( * ) Notice: Subject to any disclaimer, the term of this patent is extended or adjusted under 35 U.S.C. 154(b) by 1058 days.

This patent is subject to a terminal disclaimer.

(21) Appl. No.: 17/529,099

(22) Filed: Nov. 17, 2021

(65) Prior Publication Data

US 2023/0151692 A1 May 18, 2023

(51) Int. Cl.

*E06C 1/38* (2006.01)
*E06C 1/10* (2006.01)
*E06C 1/34* (2006.01)
*E06C 1/387* (2006.01)
*E06C 7/42* (2006.01)

(52) U.S. Cl.

CPC ................ *E06C 1/381* (2013.01); *E06C 1/10* (2013.01); *E06C 1/34* (2013.01); *E06C 1/387* (2013.01); *E06C 7/423* (2013.01)

(58) Field of Classification Search

CPC ... E06C 1/10; E06C 1/381; E06C 1/34; E06C 1/387

See application file for complete search history.

(56) References Cited

U.S. PATENT DOCUMENTS

| | | | | |
|---|---|---|---|---|
| 2,641,401 A * | 6/1953 | Herschel | E06C 7/44 | 182/189 |
| 5,040,635 A * | 8/1991 | Strickland | E06C 1/34 | 182/189 |
| 5,509,499 A * | 4/1996 | Prejean | E06C 1/381 | 182/187 |
| 9,732,556 B2 * | 8/2017 | Priest | E06C 1/381 | |
| 2012/0125715 A1 * | 5/2012 | Furseth | E06C 7/081 | 72/253.1 |
| 2014/0027204 A1 * | 1/2014 | Niemela | E06C 1/04 | 182/163 |
| 2021/0095524 A1 * | 4/2021 | Petreman | E06C 1/381 | |
| 2022/0333442 A1 * | 10/2022 | Sirlin, III | E06C 1/387 | |

* cited by examiner

*Primary Examiner* — David E Martinez
(74) *Attorney, Agent, or Firm* — James A. Italia; Italia IP

(57) ABSTRACT

A modular ladder having a single, central column for supporting radiating steps is shown and described. Steps are pivotally mounted on the central column to generate attachable modules. The steps fold up to a stowed position to minimize bulk when the ladder is not in use, and fold down to a nearly but not quite perpendicular position to facilitate climbing. The steps are held frictionally in the stowed position and by gravity in a deployed position when nearly perpendicular to the central mast. The ladder has a removable foot module for stability when propping the ladder on the ground. Each module bearing steps includes an integral loop for attachment of anchoring straps when desired.

14 Claims, 4 Drawing Sheets

MODULAR LADDER WITH CENTRAL MAST

FIELD OF THE INVENTION

The present invention relates to ladders, and more particularly, to a manually assembled and disassembled ladder having connectible modules.

BACKGROUND OF THE INVENTION

Ladders for outdoor use, such as for climbing trees and steep rock formations, are typically used in environments not conducive to carrying entire ladders in their naturally extended configuration. Additionally, trees and rock formations usually present irregular surfaces to the user of a ladder, which presents stability difficulties when erecting a ladder.

There exists a need for a ladder of minimum weight and bulk, preferably modular, and which addresses the many adverse issues encountered with using a ladder to climb trees and rock formations.

SUMMARY OF THE INVENTION

The present invention answers the above need by providing a modular ladder having a single, central column for supporting radiating steps. The ladder is made up from modules each including a section or segment of the central column, and a number of pivotally mounted steps. The steps fold up to a stowed position to minimize bulk when the ladder is not in use, and fold down to a nearly but not quite perpendicular position to facilitate climbing. The steps are held frictionally in the stowed position and by gravity in a deployed position when nearly perpendicular to the central mast.

The ladder is provided with integral loops for attachment of anchoring straps when desired.

The ladder also has a removable foot piece when propping the ladder on an upwardly facing environmental surface, such as the ground or ground root surfaces.

The various modules can be connected and detached by hand, without tools.

The present invention provides improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

Figure 1:
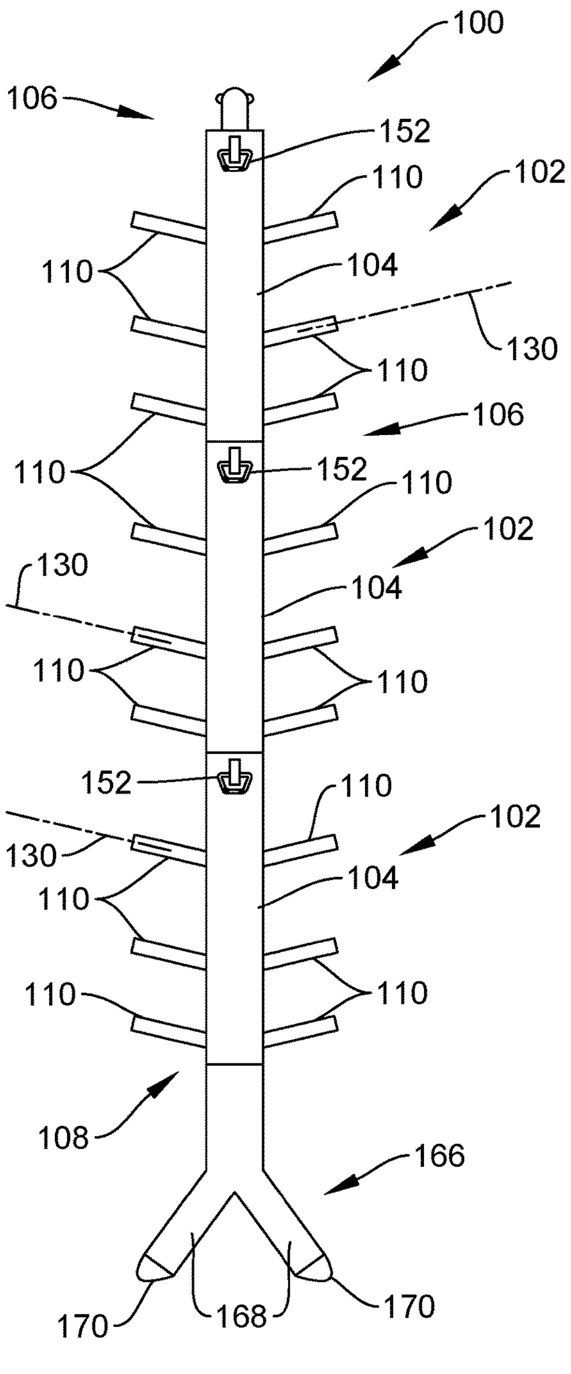
FIG. 1 is a side view of the novel modular ladder, shown in an assembled condition.

Drawings are drawn to internal scale and external scale. By internal scale it is meant that the parts, components, and proportions thereof in the illustrated inventive examples are drawn to scale relative to one another. As employed herein, external scale refers to scale of the illustrated example relative to scale of environmental elements or objects included in the drawings. Where the inventive example claims external scale, the inventive and environmental elements may of course not be drawn to real or true life scale; rather, external scale signifies only that both the invention and environmental elements are drawn in scale to each other.

DETAILED DESCRIPTION

Figure 2:
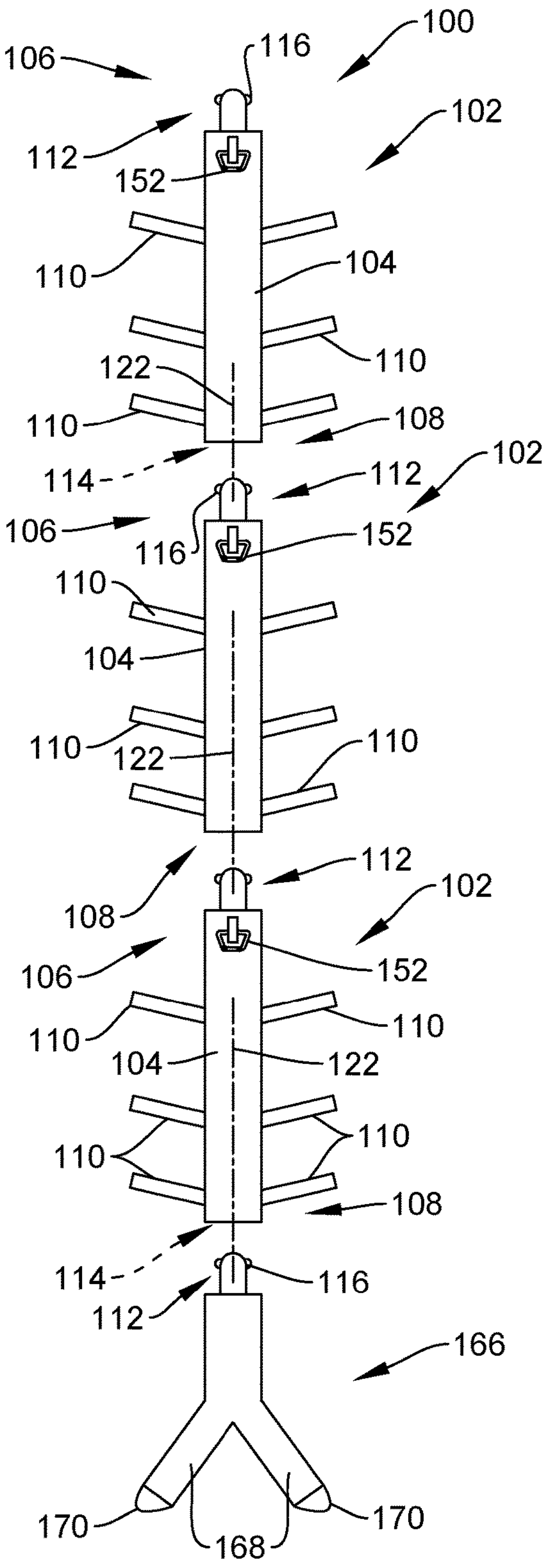
FIG. 2 is an exploded side view of FIG. 1.

Referring first to FIGS. 1 and 2, according to at least one aspect of the invention, there is shown a modular ladder 100, comprising a plurality of ladder segments 102 each comprising a central mast segment 104 having an upper end 106 and a lower end 108, and a plurality of projecting steps 110 pivotally coupled to central mast segment 102 between upper end 106 and lower end 108. Modular ladder 100 includes a first coupling element 112 at upper end 106 of ladder segment 102 enabling removable serial connection to lower end 108 of another identical ladder segment 102, and a second coupling element 114 at lower end 108 of central mast segment 104 enabling removable serial connection to upper end 106 of another identical ladder segment 102. Overall length of modular ladder 100 may be selectively increased by connecting additional ladder segments 102 at upper end 106 and at lower end 108 of ladder segment 102.

Upper and lower ends 106, 108 are meant as aids for rhetorically differentiating the two opposed ends of each central mast segment 104, and do not imply inclusion or exclusion of any component illustrated as part of central mast segment 104.

It should be noted at this point that orientational terms such as upper and lower refer to the subject drawing as viewed by an observer. The drawing figures depict their subject matter in orientations of normal use, which could obviously change with changes in posture and position of the novel modular ladder. Therefore, orientational terms must be understood to provide semantic basis for purposes of description, and do not limit the invention or its component parts in any particular way.

Unless otherwise indicated, the terms “first”, “second”, etc., are used herein merely as labels, and are not intended to impose ordinal, positional, or hierarchical requirements on the items to which these terms refer. Moreover, reference to, e.g., a “second” item does not either require or preclude the existence of, e.g., a “first” or lower-numbered item, and/or, e.g., a “third” or higher-numbered item.

Figure 3:
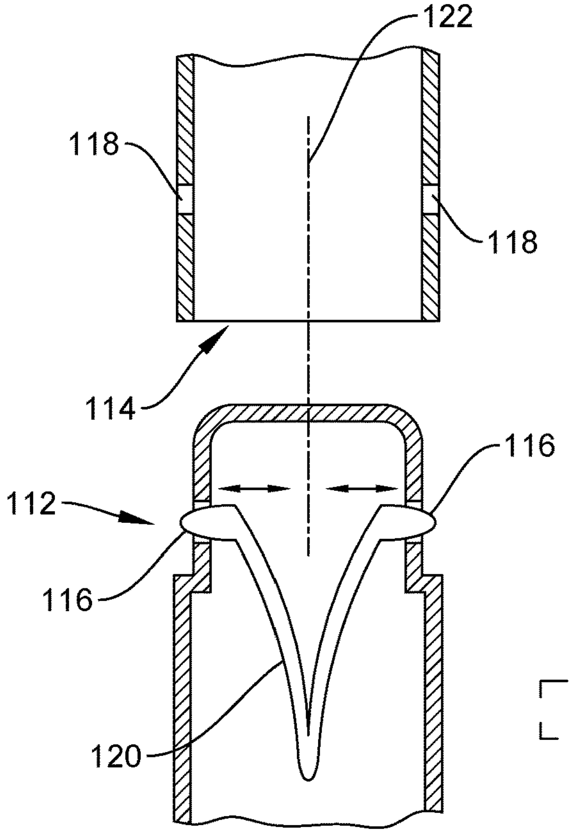
FIG. 3 is an enlarged, side sectional detail view of components shown in FIG. 1.

Referring also to FIG. 3, first coupling element 112 and second coupling element 114 of each central mast segment 104 may comprise a male socket element and a respective and complementing female socket element. The male and female socket elements slidingly interfit such that a ladder segment 102 is readily manually slid into engagement with an abutting ladder segment 102.

The male and female socket elements may be secured together to oppose inadvertent separation by the following arrangement. The male socket element may comprise opposed, outwardly biased locking pins 116, and the female socket element may comprise openings 118 (FIG. 3) each dimensioned and configured to receive one locking pin 116 therethrough such that the male socket element is locked in engagement with the female socket element when locking pins 116 penetrate openings 118 of the female socket element. Locking pins 116 are preferably domed or tapered as shown, to facilitate insertion into openings 118. The male socket element may comprise a spring 120 (FIG. 3) biased to urge locking pins 116 away from a longitudinal axis 122 (FIG. 3) of central mast segment 104 and away from one another.

It should be noted that when two or more ladder segments 102 are connected serially, modular ladder 100 has an overall continuous longitudinal axis 122. Therefore, central mast 124 (as that applies to two or more serially connected ladder segments 102) has longitudinal axis 122 extending from an upper end 126 of central mast 124 and a lower end 128 of central mast 124. In central mast 124, each projecting step 110 has a longitudinal axis 130 (several axes 130 of many are called out in FIGS. 1 and 5). Each projecting step 110 is movable between a stowed position (shown in solid lines in FIG. 4) abutting central mast segment 104 along a length of projecting step 110, and a deployed position (shown in dashed lines in FIG. 4, and in solid lines in FIGS. 1, 2, and 7) wherein projecting step 110 projects radially from central mast segment 104. Each projecting step 110 is configured to limit pivot to a maximum of an acute included angle 132 (called out in FIG. 5, but applies to all) between longitudinal axis 122 of central mast 124 and longitudinal axis 130 of projecting step 110.

Figure 5:
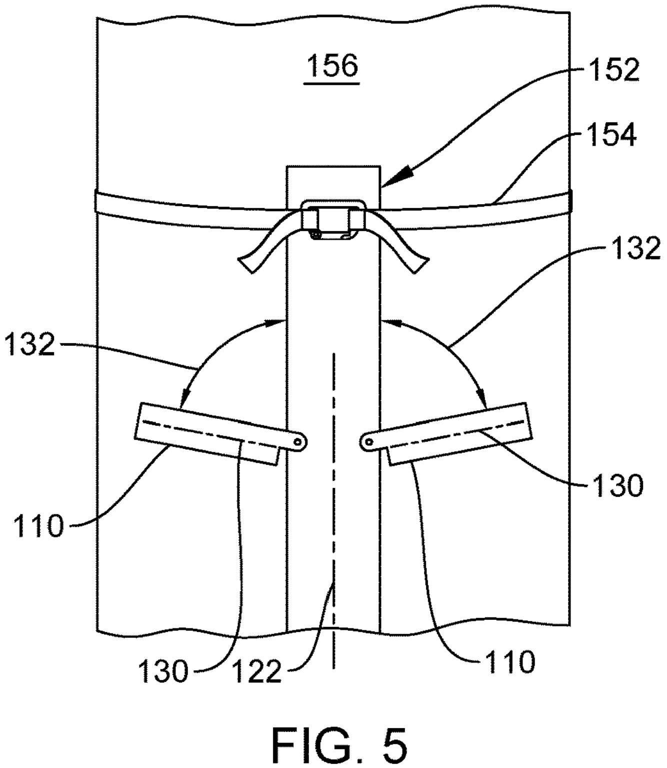
FIG. 5 is an enlarged, environmental side detail view of the novel modular ladder lashed to a tree trunk.
Figure 6:
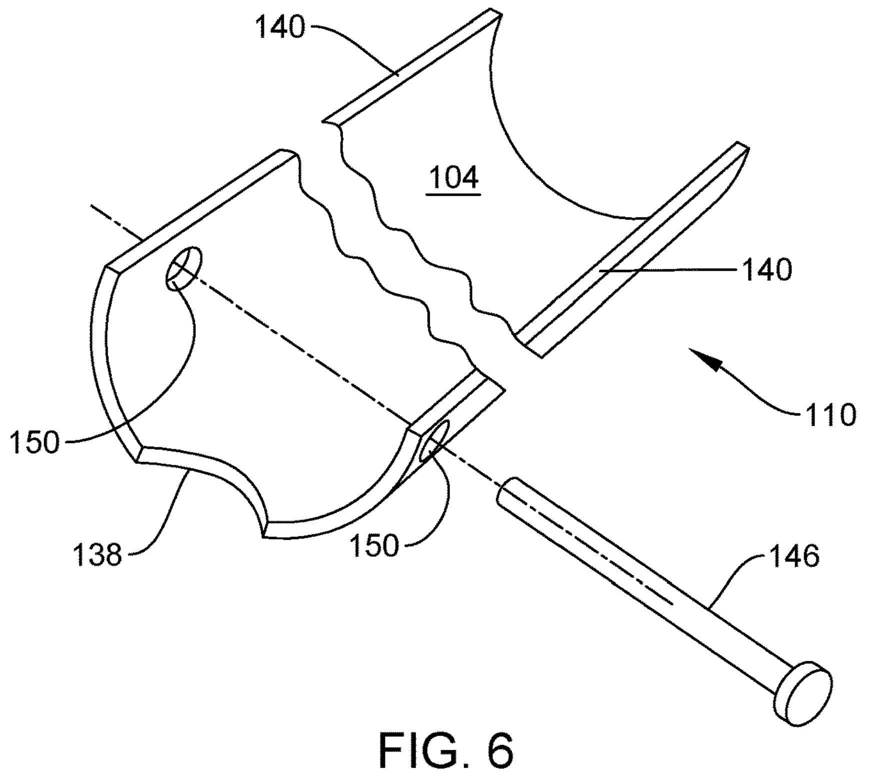
FIG. 6 is an enlarged, perspective exploded detail view of a typical step of the novel modular ladder, typical steps being shown in numbers in FIGS. 1 and 2.
Figure 7:
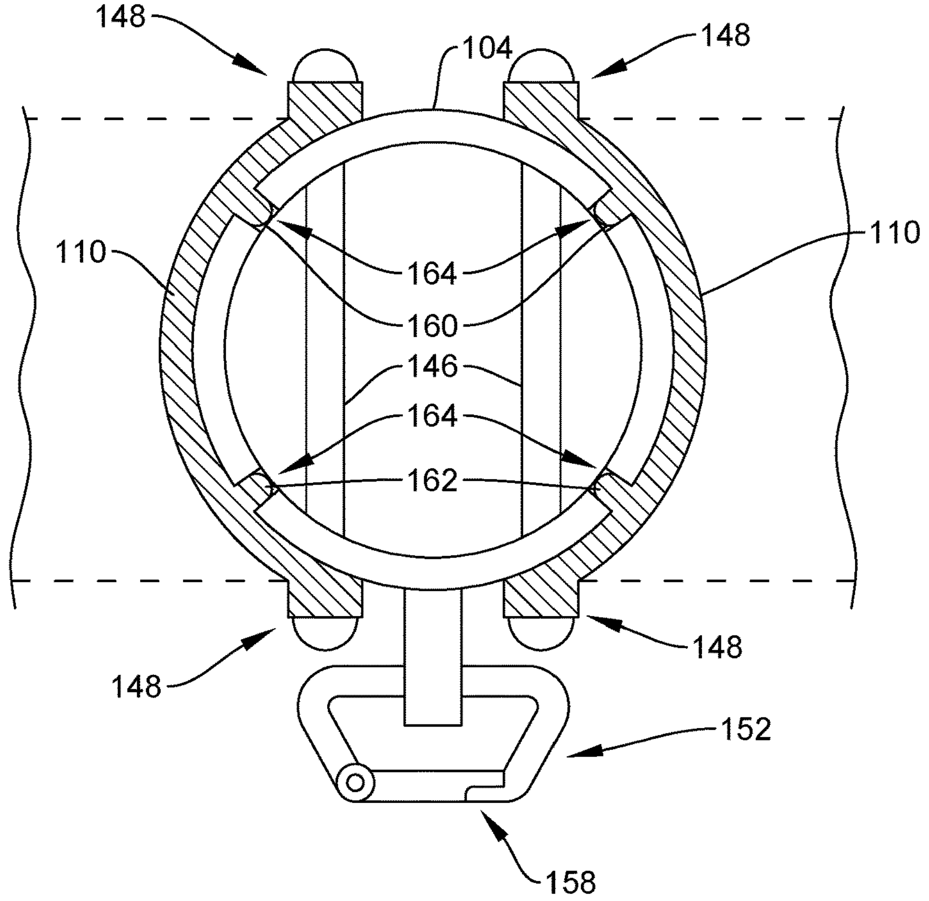
FIG. 7 is an enlarged top detail view, shown partially in cross section, taken along line 7-7 in FIG. 4.

Referring also particularly to FIG. 6, but also shown in FIG. 7, each projecting step 110 has an arcuate cross section along its length (length is indicated by longitudinal axis 130 in FIGS. 1 and 5), a proximal end 134 (FIG. 4) pivotally coupled to central mast segment 104 and an opposed distal end 136 (FIG. 4), and an arcuate recess 138 (FIG. 6) in proximal end 134. Arcuate recess 138 is dimensioned and configured to limit pivot to a maximum of an acute included angle between longitudinal axis 122 of central mast 124 and longitudinal axis 130 of projecting step 110 and for providing a greater surface area of contact that aids in supporting the projecting foot step 110 upon the central mast 104.

Figure 4:
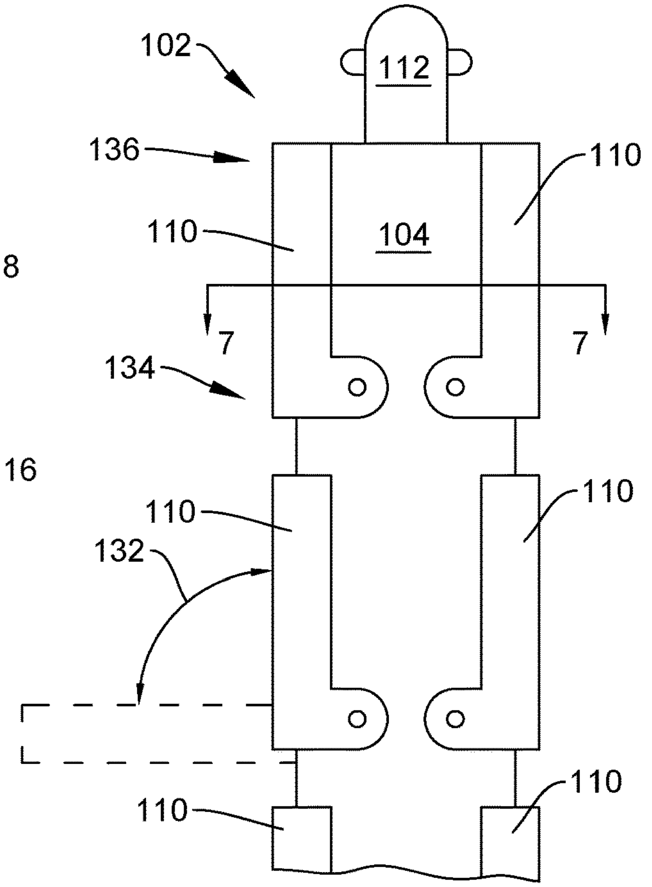
FIG. 4 is an enlarged, side detail view of components from the exploded view of FIG. 2.

Called out in FIGS. 4 and 5, in the deployed position, longitudinal axis 130 of projecting step 110 forms included angle 132 with longitudinal axis 122 of central mast 124 (or of central mast segment 104) in a range of 75 to 85 degrees. In a preferred embodiment, this included angle 132 is 80 degrees. An advantage of this included angle 132 is that should a climber's foot slip on a projecting step 110, the foot will slip towards central mast 124 and be stopped thereby, rather than slipping away from central mast 124 and potentially off projecting step 110.

Figure 8:
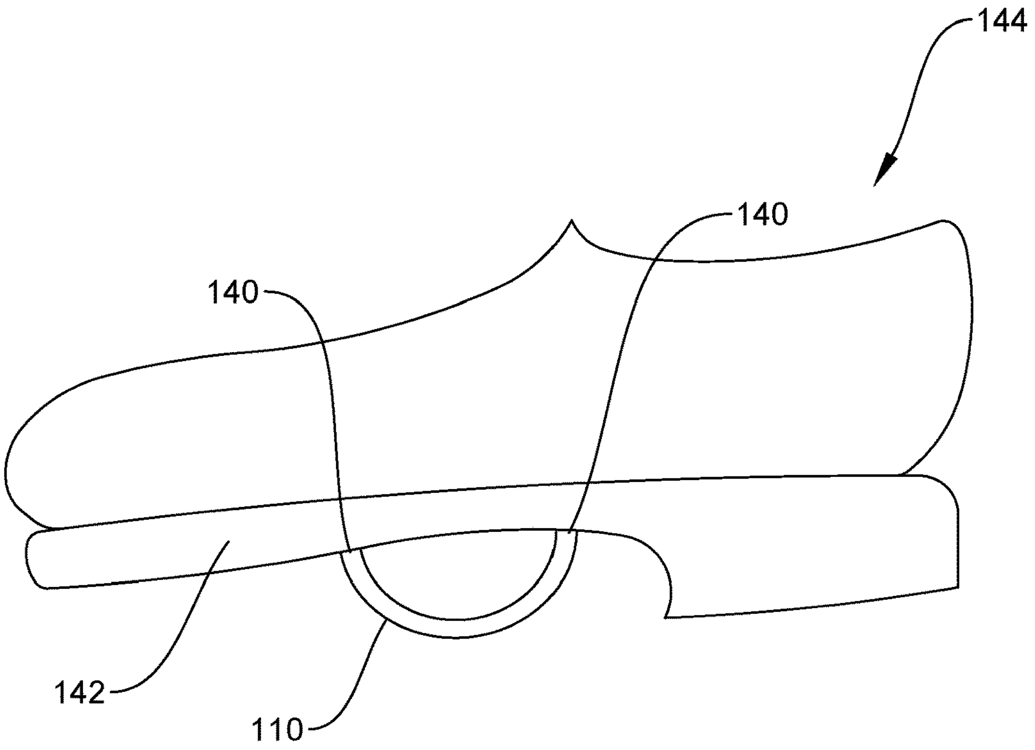
FIG. 8 is an enlarged, environmental, side detail view of a user standing on a step of the novel modular ladder.

With reference to FIGS. 6 and 8, each projecting step 110 has two opposed, parallel, upwardly facing edges 140 when pivoted to the deployed position. As will be appreciated with consideration of FIG. 8, edges 140 collectively present a surface likely to engage a sole 142 of a shoe 144 worn by the climber using modular ladder 100. Because the two edges 140 collectively define a generally horizontal planar support surface for shoe 144, and because relatively narrow edges 140 will tend to slightly penetrate sole 142, where sole 142 is resilient, or alternatively, where sole 142 has treads, footing is rendered reasonably secure.

Returning to FIGS. 6 and 7, modular ladder 100 may further comprise a pivot pin 146 for each projecting step 110. Pivot pin 146 connects to projecting step 110 at two spaced apart points 148 (FIG. 7). Central mast segment 104 includes two spaced apart holes 150 (FIG. 6) through which pivot pin 146 extends, whereby pivot pin 146 is stably journaled at two spaced apart points 150 (FIG. 7) of central mast segment 104.

Projecting steps 110 may be present in different schemes in any ladder segment 102. Referring to FIGS. 1 and 2, three projecting steps 110 may project from one side of central mast segment 104 in the deployed position, and three (other) projecting steps 110 may project from an opposed side of central mast segment 104 in the deployed position. More particularly, for each projecting step 110 on one side of central mast segment 104, there may be a corresponding projecting step 110 on the other side (i.e., an opposed side) of central mast segment 104 at the same point along longitudinal axis 122 of central mast segment 104.

Figure 9:
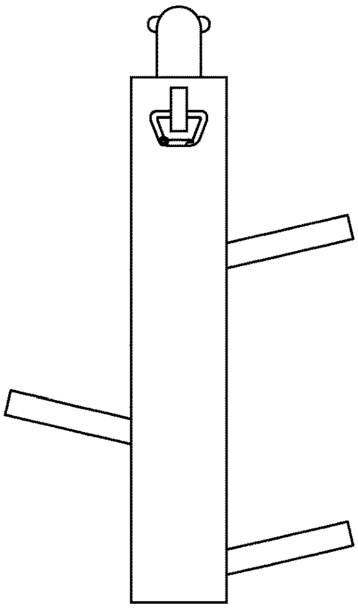
FIG. 9 is a side detail view of an alternative embodiment of components seen in the center of FIGS. 1 and 2.

In a variation on the projecting step 110 scheme of FIGS. 1 and 2, and referring now to FIG. 9, at least one projecting step 110 projects to one side of central mast segment 104 in the deployed position, and at least two projecting steps 110 project to an opposed side of central mast segment 104 in respective deployed positions. The arrangement of FIG. 9 provides a minimum number of projecting steps 110 required to accommodate a usual climbing motion wherein body weight is born alternatingly on right and left legs.

Referring now to FIGS. 1, 2, 5, and 7, modular ladder 100 may further comprise a loop 152 for receiving a strap 154 (FIG. 5). Loop 152 may be coupled to central mast segment 104 on a side of central mast segment 104 not having projecting step 110. As best seen in FIG. 7, projecting steps 110 are on respective right and left sides of central mast segment 104. Loop 152 is on a lowermost surface of central mast segment 104, as seen in the depiction of FIG. 7. This arrangement enables the uppermost side of central mast segment 104 (as seen in FIG. 7) to be positioned against an environmental surface such as tree 156 (FIG. 5), with projecting steps 110 projecting to the right and left of central mast segment 104, and with loop 152 readily accessible on central mast segment 104 opposite tree 156.

Advantageously, loop 152 may comprise a carabiner 158 (FIG. 7).

Referring now to FIGS. 4 and 7, modular ladder 100 may further comprise, for each projecting step 110, a retention element securing one projecting step 110 against central mast 124 (or central mast segment 104) in the stowed position. FIGS. 4 and 7 illustrate stowed positions of projecting steps 110 in solid lines, and deployed positions in broken lines. In an embodiment, the retention element includes a first finger 160 projecting from projecting step 110 and a second finger 162 projecting from projecting step 110 at a different point along a circumference of central mast segment 104. Central mast segment 104 includes a recess 164 (or hole 164) (FIG. 7) for receiving and releasably engaging each one of first finger 160 and second finger 162. First and second fingers 160, 162 may frictionally fit within recess 164, or may be slightly bigger than recess 164 and mildly compressible, so that they are retained within recess 164.

Turning now to FIGS. 1 and 2, modular ladder 100 may further comprise a foot piece 166 releasably attachable to the first coupling element or to the second coupling element of central mast segment 104. Foot piece 166 may include a plurality of ground engaging stabilizing legs 168 configured to engage a ground surface (not shown) when foot piece 166 is releasably attached to the first coupling element or to the second coupling element of central mast segment 104. First and second coupling elements may be employed to retain foot piece 166, as their use for connecting ladder segments 102 makes their use intuitive. Other types of connections may be used to retain foot piece 166 if desired. Stabilizing legs 168 may be provided with resilient feet 170 if desired.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A modular ladder, comprising:

a plurality of ladder segments each comprising:

a central mast segment having an upper end and a lower end, wherein the central mast segment has a longitudinal axis extending from the upper end of the central mast segment and the lower end of the central mast segment;

a plurality of projecting steps pivotally coupled to the central mast segment between the upper end and the lower end, wherein each said projecting step has a longitudinal axis, and wherein each said projecting step is movable between a stowed position abutting the central mast segment along a length of said projecting step, and a deployed position wherein the projecting step projects radially from the central mast segment, and each said projecting step is configured to limit pivot to a maximum of an acute included angle between the longitudinal axis of the central mast segment and the longitudinal axis of said projecting step, wherein for each a said projecting step further includes a retention element securing one of a said projecting step against the central mast segment in the stowed position, wherein the retention element includes a first finger projecting from the projecting step and a second finger projecting from the projecting step at a different point along a circumference of the central mast segment, and the central mast segment includes a recess for receiving and releasably engaging one of the first finger and the second finger; and a first coupling element at the upper end of the central mast segment enabling removable serial connection to a said lower end of another identical said ladder segment, and a second coupling element at the lower end of the central mast segment enabling removable serial connection to a said upper end of another identical said ladder segment, whereby the overall length of the modular ladder may be selectively increased by connecting additional said ladder segments at the upper end and at the lower end of the ladder segment.

2. The modular ladder of claim 1, wherein each said projecting step has an arcuate cross section along its length, a proximal end pivotally coupled to the central mast segment, and an opposed distal end, and an arcuate recess in the proximal end, the arcuate recess dimensioned and configured to limit pivot to a maximum of an acute included angle between the longitudinal axis of the central mast segment and the longitudinal axis of said projecting step.

3. The modular ladder of claim 2, wherein each projecting step has two opposed, parallel, upwardly facing edges when pivoted to the deployed position.

4. The modular ladder of claim 2, further comprising a pivot pin for each said projecting step, wherein the pivot pin connects to the projecting step at two spaced apart points, and the central mast segment includes two spaced apart holes through which the pivot pin extends, whereby the pivot pin is stably journaled at two spaced apart points of the central mast segment.

5. The modular ladder of claim 1, wherein at least one projecting step projects to one side of the central mast segment in the deployed position, and at least two projecting steps project to an opposed side of the central mast segment in respective deployed positions.

6. The modular ladder of claim 1, wherein three said projecting steps project from one side of the central mast segment in the deployed position, and three said projecting steps project from an opposed side of the central mast segment in the deployed position.

7. The modular ladder of claim 6, wherein for each said projecting step on one side of the central mast segment, there is a corresponding said projecting step on the other side of the central mast segment at the same point along the longitudinal axis of the central mast segment.

8. The modular ladder of claim 1, wherein in the deployed position, the longitudinal axis of the projecting step forms an included angle with the longitudinal axis of the central mast in a range of 75 to 85 degrees.

9. The modular ladder of claim 1, wherein the first coupling element and the second coupling element of the central mast segment comprise a male socket element and a respective and complementing female socket element.

10. The modular ladder of claim 9, wherein the male socket element comprises opposed, outwardly biased locking pins, and the female socket element comprises openings each dimensioned and configured to receive one said locking pin therethrough such that said male socket element is locked in engagement with said female socket element when the locking pins penetrate the openings of the female socket element.

11. The modular ladder of claim 10, wherein the male socket element comprises a spring biased to urge the locking pins away from the longitudinal axis of the central mast segment and from one another.

12. The modular ladder of claim 1, further comprising a loop for receiving a strap, the loop coupled to the central mast segment on a side of the central mast segment not having one of said projecting steps.

13. The modular ladder of claim 12, wherein the loop comprises a carabiner.

14. The modular ladder of claim 1, further comprising a foot piece including a first coupling element that is releasably attachable to the second coupling element of the central mast segments, and including a plurality of ground engaging stabilizing legs configured to engage a ground surface when the foot piece is releasably attached to the central mast segment.

* * * * *